(12) United States Patent
Gopinath et al.

(10) Patent No.: US 8,509,742 B2
(45) Date of Patent: *Aug. 13, 2013

(54) INTELLIGENT CALL NOTIFICATION IN A COMMUNICATION NETWORK

(75) Inventors: Radhakrishnan Gopinath, Alpharetta, GA (US); David Darrell Nesbitt, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/783,962

(22) Filed: May 20, 2010

(65) Prior Publication Data

US 2011/0287746 A1    Nov. 24, 2011

(51) Int. Cl.
*H04L 12/58* (2006.01)

(52) U.S. Cl.
USPC ............. 455/412.1; 455/412.2; 455/413; 455/421; 455/414.1; 455/414.2; 379/67.1

(58) Field of Classification Search
USPC ........... 455/412.1, 412.2, 413, 421, 414.1, 455/414.2; 379/67.1
See application file for complete search history.

(56) References Cited

U.S. PATENT DOCUMENTS

| 2006/0031904 | A1* | 2/2006 | Groff et al. | 725/106 |
|---|---|---|---|---|
| 2006/0085832 | A1* | 4/2006 | Groff et al. | 725/106 |
| 2006/0222152 | A1* | 10/2006 | Elias et al. | 379/88.13 |
| 2009/0017802 | A1* | 1/2009 | Zhang et al. | 455/414.1 |
| 2009/0190734 | A1* | 7/2009 | White et al. | 379/201.02 |

* cited by examiner

*Primary Examiner* — Kamran Afshar
*Assistant Examiner* — Khalid Shaheed
(74) *Attorney, Agent, or Firm* — Merchant & Gould

(57) ABSTRACT

Notification of missed voice calls directed to non-responsive called party devices in a communication network is provided. An incoming call directed to a called party device, when the called party device is in a non-responsive state, are received at a messaging platform. Call data associated with the call is stored at the messaging platform. The stored call data is utilized to generate a notification of the call. The notification of the call is sent from the messaging platform to the called party device or another device associated with the called party. The notification may include an identification of the calling party and a date and time when the call was made.

18 Claims, 3 Drawing Sheets

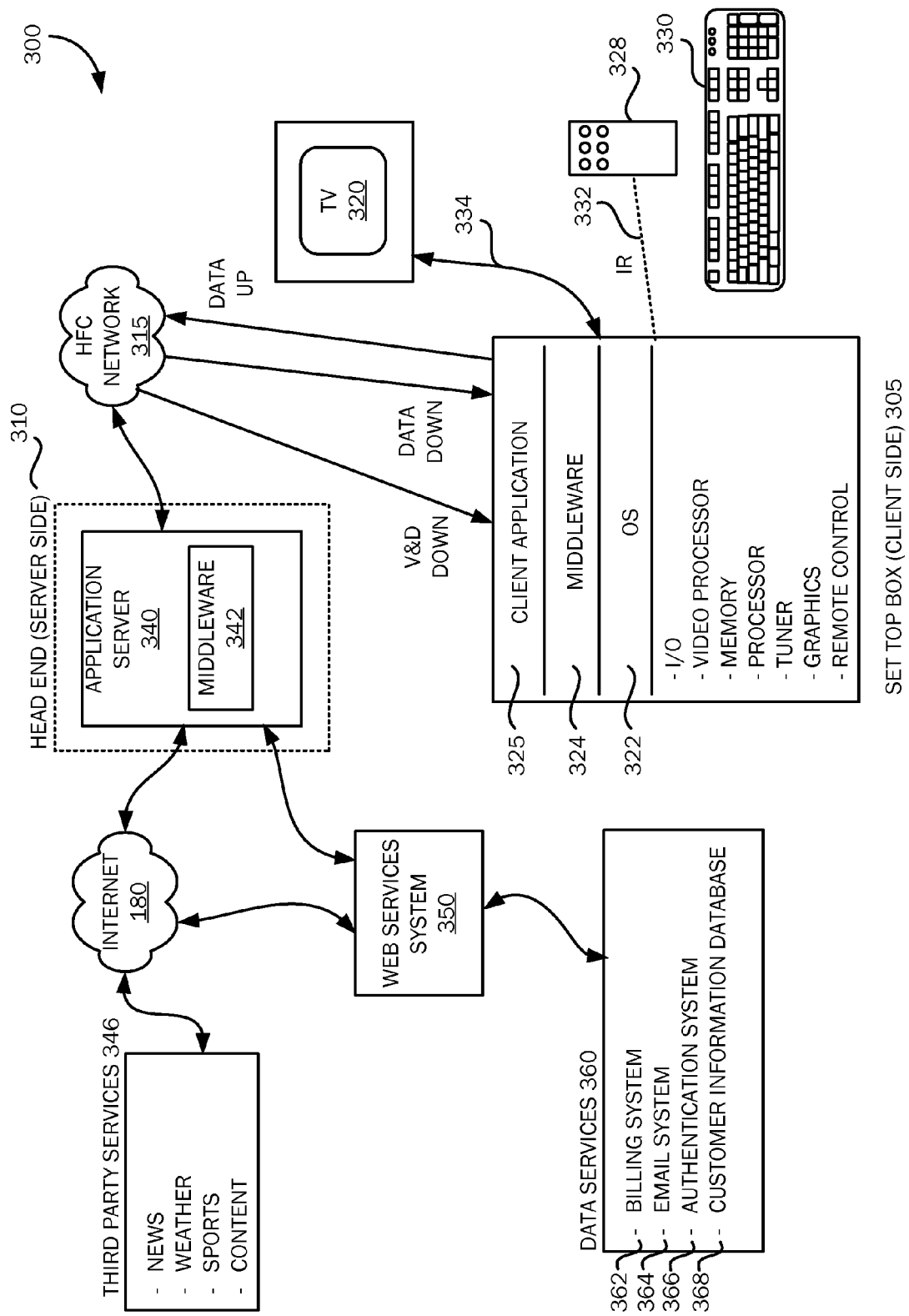

INTELLIGENT CALL NOTIFICATION IN A COMMUNICATION NETWORK

BACKGROUND

Mobile devices, such as cellular telephones, are typically configured to automatically provide a missed call notification for unanswered incoming voice calls made to subscribers whose devices are in a responsive state (i.e., turned on). For example, a missed call notification to a mobile device which is in a responsive state may include a voicemail indicator or icon indicating that a calling party has left a voicemail to a called party associated with a mobile device. A missed call notification to a mobile device which is in a responsive state may also include a missed call message indicating that a calling party had initiated a call to the mobile device which was terminated (either voluntarily or involuntarily) prior to being routed to voicemail. Currently, however, mobile devices are unable to provide missed call notifications to users when the devices are in a non-responsive state. For example, missed call notifications are not generated for calls made to a mobile device which is turned off and where the calling party chooses not to leave a voicemail message. As another example, missed call notifications are also not generated for calls made to mobile devices which are in a "flight" or "airplane" mode, during which the mobile device's capacity to place or receive calls or text messages is disabled. It is with respect to these and other considerations that the present invention has been made.

SUMMARY

Embodiments of the present invention solve the above and other problems by providing notification of missed voice calls directed to non-responsive called party devices in a communication network. An incoming call directed to a called party device, when the called party device is in a non-responsive state, are received at a messaging platform. In accordance with an embodiment, the incoming call may be received at the messaging platform immediately (e.g., when a switch in the communication network determines that the called party device is in a non-responsive state and subsequently diverts the incoming call to the messaging platform). In accordance with another embodiment, the incoming call may be allowed to ring on the called party device and then disconnected prior to the call being received by the messaging platform (e.g., an incoming call to the called party device is allowed to continue to ring by the calling party who then subsequently hangs up before the call is diverted to the messaging platform). Call data associated with the call is stored at the messaging platform. The stored call data is utilized to generate a notification of the call. The notification of the call is sent from the messaging platform to the called party device or another device associated with the called party. The notification may include an identification of the calling party and a date and time when the call was made.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3 is a simplified block diagram of a cable services system architecture in which embodiments of the invention may be implemented.

DETAILED DESCRIPTION

Figure 1:
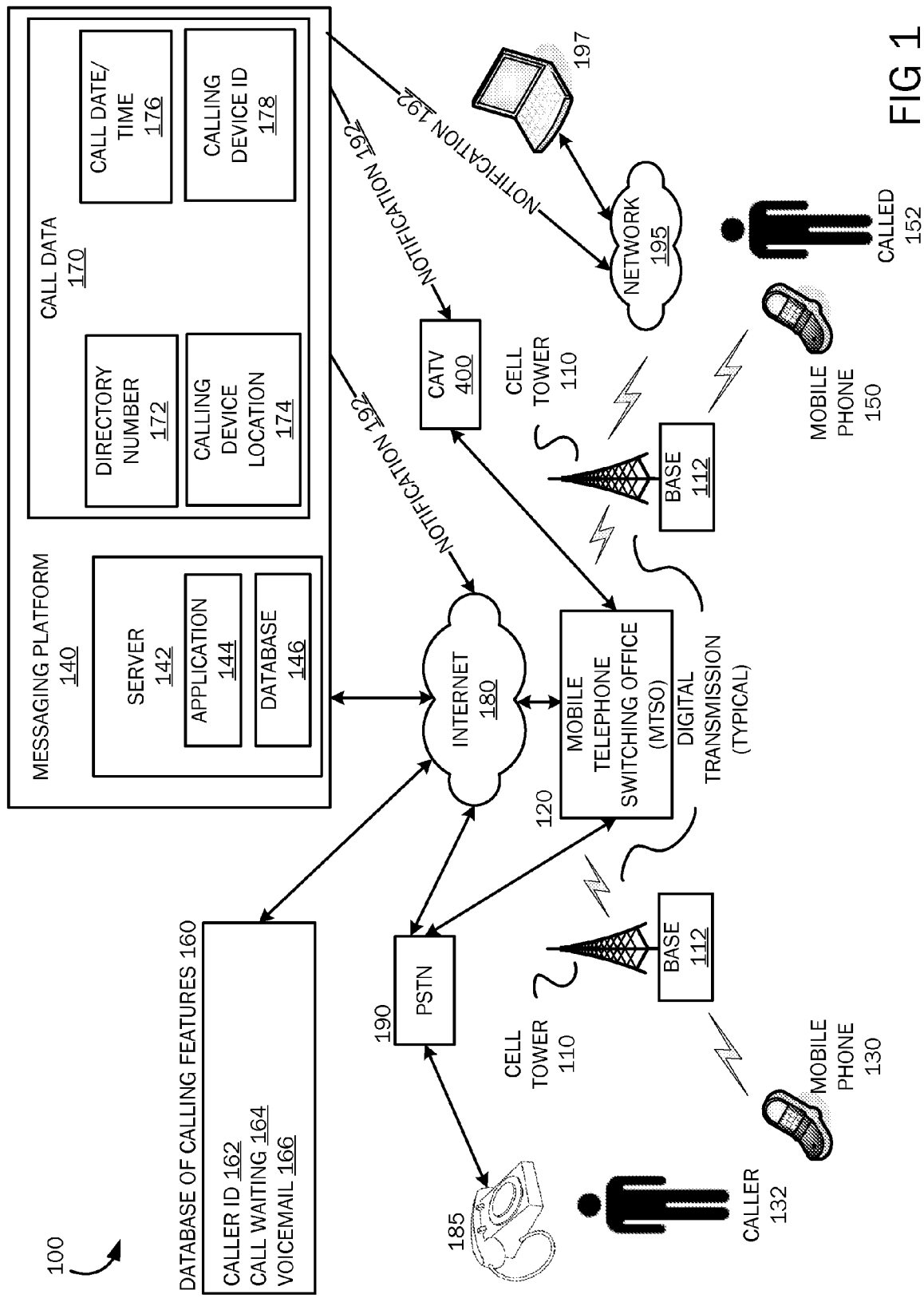
FIG. 1 is simplified block diagram illustrating a wireless communication network architecture that serves as an exemplary operating environment for the present invention.

As briefly described above, embodiments of the present invention are directed to providing notification of missed voice calls directed to non-responsive called party devices in a communication network. An incoming call is directed to a called party device, when the called party device is in a non-responsive state, are received at a messaging platform. Call data associated with the call is stored at the messaging platform. The stored call data is utilized to generate a notification of the call. The notification of the call is sent from the messaging platform to the called party device or another device associated with the called party. The notification may include an identification of the calling party and a date and time when the call was made.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is simplified block diagram illustrating a wireline, wireless and networked communication/services architecture 100 that may serves an exemplary operating environment for the present invention. As should be understood, the example communication/services network architecture illustrated in FIG. 1 is for purposes of example and is not limiting of a variety of communications configurations that may be utilized as described herein. Referring now to FIG. 1, wireline and wireless communication services are provided by various service provider companies through a wireline and wireless network. As is known to those skilled in the art, a wireline network may consist of but not be limited to a public switched telephone network (PSTN) or other suitable wireline telephone system. A wireline network may employ the use of landline communication devices such as a telephone 185.

As is known to those skilled in the art, wireless networks/services may consist of but not be limited to cellular towers 110, base stations 112, Mobile Telephone Switching Office (hereafter referred to as "MTSO") 120, and a server 142. As should be appreciated, wireless communications may also be accomplished via Internet Protocol (IP) based systems and wireless fidelity (Wi-Fi) based systems via distributed computing networks such as the Internet. As is known to those skilled in the art, a cellular tower 110 typically consists of a steel pole or lattice structure outfitted with antennae for transmitting and receiving signals to and from wireless devices (for example, a mobile phone, personal digital assistant (PDA), smart phone, etc.), other cellular towers, and the MTSO 120. Each cellular tower 110 may have multiple sets of antennae mounted, depending upon how many different service providers use the cellular towers 110.

The base station 112 of each cellular tower 110 may include sets of transmitters and receivers from each service provider having antennae mounted to the cellular towers 110.

As a unit, the cellular towers 110 and the base stations 112 form a system capable of transmitting, receiving, and managing data. This data may consist of, but not be limited to, voice, text, and/or electronic media. As is understood by those skilled in the art, wireless systems typically operate at various frequencies (e.g., a 700 megahertz (MHz) frequency, a 2.5 gigahertz (GHz) frequency (i.e., "4G"), or across a frequency range from 800 MHz to 1900 MHz), depending upon which wireless technology is utilized.

Referring still to FIG. 1, a wireless network may also employ the use of mobile devices such as mobile phones 130, 150. It should be understood that the mobile phones 130, 150 may include cellular telephones, personal digital assistants (PDAs), smart phones, etc., which are capable of sending and receiving communications in the same frequency range as the wireless communications system. The term "mobile device" will be used herein to describe a wireless electronic communication device capable of sending and receiving wireless communications. As is understood by those skilled in the art, mobile phones 130, 150 may comprise, but are not limited to, internal circuit boards, antennae, liquid crystal displays (LCDs), keyboards, microphones, speakers, and batteries. All of the components and systems making up mobile phones 130, 150, work together to send, receive, and manage communications within and beyond the cellular network.

Referring still to FIG. 1, an MTSO 120 serves as a central control center for the base stations 112 operating in a given area. For example, an MTSO 120 may be configured for controlling wireless communications for a wireless service provider operating in a specified city or other suitable operating area or region. In addition to other operating functions of the MTSO 120, according to embodiments of the present invention, the MTSO 120 may serve as control point for determining, providing and controlling subscriber features. For example, in accordance with embodiments of this invention, a customer information database 160 may contain data to allow a determination as to whether a particular feature or service is provisioned for a given wireless communications device account. An example of such a feature or service may be Caller ID 162, Call Waiting 164 or Voicemail 166. Thus, if a caller 132 using mobile phone 130 or the telephone 185, attempts a call to mobile phone 150, a customer information database 160 may be parsed to present feature and service options that have already been provisioned when a call is completed to a called party 152.

In accordance with various embodiments, a messaging platform 140 may include a server 142 and call data 170. The messaging platform 140 may comprise a system operative to generate, store and manage audio voicemail messages in the communication/services architecture 100. The server 142 may comprise a general-purpose computing system, including a processor and a memory storage, which is operative to assemble and manage data sent to and received from the MTSO 120 via traditional communications links, such as Internet 180 communication links, publicly switched telephone circuits, wireless communications circuits, cable communications circuits, satellite communications circuits and the like. The server 142 may be further operative to execute an application 144 and store a database 146. It should be appreciated that the server 142 may comprise a standalone server/software system or (as shown in FIG. 1) integrated with the messaging platform 140.

In accordance with an embodiment, the application 144 may comprise a software module executing on the server 142, which may be operative to instruct the messaging platform 140 to receive a voice call directed to a called party device (e.g., the mobile phone 150) when the called party device is in a non-responsive state and store data associated with the call as the call data 170. The application 144 may further be operative to generate a notification 192 utilizing the call data 170 at the messaging platform 140 and send the notification 192 from the messaging platform 140 to the mobile phone 150, a set-top box (not shown) in CATV system 300, and/or a computer 197 which is in communication with network 195 (which may comprise the Internet). The notification 192 may include a message comprising an identification of the calling party and a date and time when the voice call was made. Examples of such messages may include, but are not limited to, SMS (Short Message Service) and/or electronic mail (email) messages. The application 144 may further be operative to access a contacts list in the database 146 and compare the call data 170 with the database 146 to determine a match, prior to generating and sending the notification 192. The call data 170 may include, but is not limited to, one or more directory numbers 172, a calling device location 174 (which may be obtained via a Global Positioning System (GPS) service), call date/time data 176, and a calling device ID 178 (e.g., the name of the caller 132 associated with the mobile phone 130 or the telephone 185). Additional details regarding the functionality of the application 144 executing on the server 142 will be discussed below with respect to FIG. 2.

Figure 2:
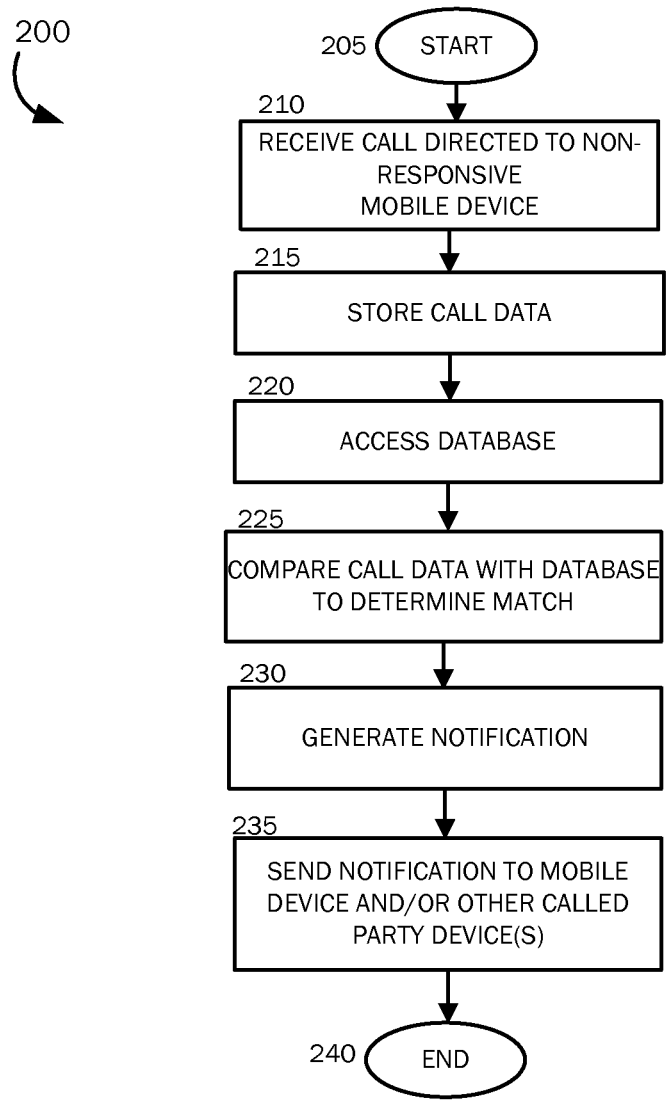
FIG. 2 is a flow diagram showing an illustrative routine for providing a notification of missed voice calls directed to non-responsive called party devices in a communication network.

Having described an exemplary operating environment 100 with respect to FIG. 1, FIG. 2 is a flow diagram showing an illustrative routine 200 for providing a notification of missed voice calls directed to non-responsive called party devices in a communication network. The routine 200 begins at start block 205 and proceeds to block 210 where the messaging platform 140 receives a call directed to a non-responsive mobile device such as the mobile phone 150. As defined herein a non-responsive mobile device includes a mobile device which is in a non-responsive state. In accordance with various embodiments, non-responsive states may include, but are not limited to, mobile devices which are turned off, set to a "flight" or "airplane" mode (i.e., the mobile device's capacity to place or receive calls is disabled), mobile devices which are out of range of a coverage area served by the communication network. It should be understood that in accordance with various embodiments, the calling party making the call which is received by the messaging platform 140 does not leave a voicemail message for the called party. As a result, in the absence of the notification provided by the embodiments described herein, the called party would not know that the calling party attempted to call the called party's mobile device once the mobile device returned from a non-responsive state.

At block 215, the messaging platform 140 stores the call data 170 associated with the call received at block 210. In particular, the messaging platform 140 may be configured to store the directory number 172 (i.e., telephone number) of the calling party's device (e.g., the mobile phone 130 or the telephone 185), the calling device location 174 (e.g., GPS location) of the mobile phone 130 or the telephone 185, the call date/time 176, and/or the calling device ID 178 (e.g., the name of the caller 132 associated with the mobile phone 130 or the telephone 185).

At block 220, the application 144 executing on the server 142 accesses the database 146 and, at block 225, compares the call data 170 with entries in the database 146 to determine a match. In particular, in accordance with an embodiment, the database 146 may contain an address book of names and/or directory numbers designated by the called party 152. In this embodiment, the application 144 may be configured to only generate notifications when the call data 170 matches data (e.g., names and or directory numbers) in the database 146 thereby ensuring that the called party 152 is only notified of missed calls from designated calling parties.

At block 230, the application 144 executing on the server 142 generates the notification 192 utilizing the call data 170 at the messaging platform 140. In accordance with an embodiment, the notification 192 may comprise an SMS for sending to the called party's mobile device (e.g., the mobile phone 150). In accordance with another embodiment, the notification 192 may comprise an electronic mail message which may be sent to one or more of the following: the called party's mobile device, a set-top box in the CATV system 300, and the computer 197.

At block 235, the application 144 executing on the server 142 send the notification 192 to the called party's mobile device (e.g., the mobile phone 150) and/or one or more additional devices associated with the called party 152 such as a set-top box in the CATV system 300 and the computer 197. The notification 192 may comprise an SMS or electronic mail message which includes one or more of the directory number associated with the calling device (e.g., the mobile phone 130 or the telephone 185), the name of the calling party, the call date/time, and the geographic location of the calling device. The routine 200 ends at block 240.

In accordance with an embodiment, prior to sending an SMS message to the called party's mobile device, the application 144 may be configured to communicate with the MTSO 120 to determine whether or not the called party's mobile device is in a responsive state. That is, the application 144 may communicate with the MTSO 120 to determine when the previously non-responsive called party's mobile device is in a turned on state or within a coverage area served by the communication/services architecture 100. For example, the application 144 may wait to receive a confirmation from the MTSO 120 that the called party's mobile device is receiving a signal from the base 112 prior to sending the SMS message.

In accordance with another embodiment, the application 144 may be configured to send the notification 192 as an electronic mail message via the Internet 180 to the called party's mobile device. In accordance with yet another embodiment, the application 144 may be configured to send the notification 192 for display via a set-top box (cable services system computing device) and television combination associated with the called party 152 in the CATV system 300. That is, the called party 152 may receive the notification 192 (e.g., as an electronic mail message) on a television display screen via the computing functionality of an associated cable services system set-top box, as described below. The set-top box may be configured for communicating with the messaging platform 140. It should be appreciated that the application 144 may be configured to utilize an application programming interface (API) to communicate with the CATV system 300 and access the called party's Media Access Control (MAC) address to retrieve the called party's set-top box in the CATV system 300. The application 144 may then be configured to utilize the retrieved MAC address to send the notification 192 (e.g., an electronic mail message) directly to the called party's set-top box for display on a connected television.

In accordance with yet another embodiment, the application 144 may be configured to send the notification 192 as an electronic mail message to a computer (e.g., the computer 197) associated with the called party 152 via the network 195 (which may comprise the Internet). In this embodiment, the application 144 may be configured with the called party's electronic mail address to utilize for sending the electronic mail message to a computer for later retrieval by the called party 152.

It should be appreciated that the application 144 may be configured with a scheduling function for sending the notification 192 in accordance with one or more of the embodiments discussed above, based on a user-specified schedule set by the called party 152. For example, if the called party 152 knows that he or she typically leaves their mobile device in a room of their residence after 8 PM on weekdays while watching television in another room, the application 144 may be configured to only send the notification 192 to the called party's set-top box during this period.

FIG. 3 is a simplified block diagram illustrating the CATV system 300 architecture that may serves as an exemplary operating environment for this embodiment. Communication between the communication/services architecture 100 illustrated in FIG. 1 and the CATV system 300 illustrated in FIG. 3 may be accomplished via any suitable wireline or wireless connectivity between the wireless communication system and the CATV system 300.

Referring now to FIG. 3, digital and analog video programming, information content and interactive television services are provided via a hybrid fiber coax (HFC) network 315 to a television set 320 for consumption by a cable television/services system customer. As is known to those skilled in the art, HFC networks 315 combine both optical fiber and coaxial cable lines. Typically, optical fiber runs from the cable head end 310 to neighborhoods of 500 to 2,000 customers. Coaxial cable runs from the optical fiber feeders to each customer. According to embodiments of the present invention, the functionality of the HFC network 315 allows for efficient bidirectional data flow between the client-side set-top box 305 and the server-side application server 340 of the present invention.

According to embodiments of the present invention, the CATV system 300 is in the form of a distributed client-server computing system for providing video and data flow across the HFC network 315 between server-side services providers (e.g., cable television/services providers) via a server-side head end 310 and a client-side customer via a client-side set-top box (STB) functionally connected to a customer receiving device, such as the television set 320. As is understood by those skilled in the art, modern CATV systems 300 may provide a variety of services across the HFC network 315 including traditional digital and analog video programming, telephone services, high speed Internet access, video-on-demand, and information services.

On the client side of the CATV system 300, digital and analog video programming and digital and analog data are provided to the customer television set 320 via the set-top box (STB) 305. Interactive television services that allow a customer to input data to the CATV system 300 likewise are provided by the STB 305. As illustrated in FIG. 3, the STB 305 is a multipurpose computing device having a computer processor, memory and an input/output mechanism. The input/output mechanism receives input from server-side processes via the HFC network 315 and from customers via input devices such as the remote control device 328 and the keyboard 330. The remote control device 328 and the keyboard 330 may communicate with the STB 305 via a suitable communication transport such as the infrared connection 332. The STB 305 also includes a video processor for processing and providing digital and analog video signaling to the television set 320 via a cable communication transport 334. A multi-channel tuner is provided for processing video and data to and from the STB 305 and the server-side head end system 310, described below.

The STB 305 also includes an operating system 322 for directing the functions of the STB 305 in conjunction with a variety of client applications 325. For example, if a client application 325 requires a news flash from a third-party news source to be displayed on the television 320, the operating system 322 may cause the graphics functionality and video processor of the STB 305, for example, to output the news flash to the television 320 at the direction of the client application 325 responsible for displaying news items.

Because a variety of different operating systems 322 may be utilized by a variety of different brands and types of set-top boxes, a middleware layer 324 is provided to allow a given software application to be executed by a variety of different operating systems. According to an embodiment of the present invention, the middleware layer 324 may include a set of application programming interfaces (API) that are exposed to client applications 325 and operating systems 322 that allow the client applications to communicate with the operating systems through common data calls understood via the API set. As described below, a corresponding middleware layer is included on the server side of the CATV system 300 for facilitating communication between the server-side application server and the client-side STB 305. According to one embodiment of the present invention, the middleware layer 342 of the server-side application server and the middleware layer 324 of the client-side STB 305 format data passed between the client side and server side according to the Extensible Markup Language (XML).

The set-top box 305 passes digital and analog video and data signaling to the television 320 via a two-way communication transport 334. The STB 305 may receive video and data from the server side of the CATV system 300 via the HFC network 315 through a video/data downlink and data via a data downlink. The STB 305 may transmit data from the client side of the CATV system 300 to the server side of the CATV system 300 via the HFC network 315 via one data uplink. The video/data downlink is an "in band" downlink that allows for digital and analog video and data signaling from the server side of the CATV system 300 through the HFC network 315 to the set-top box 305 for use by the STB 305 and for distribution to the television set 320. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 3, between the HFC network 315 and the set-top box 305 comprise "out of band" data links. As is understand by those skilled in the art, the "out of band" frequency range generally lies between zero and 54 megahertz. According to embodiments of the present invention, data flow between the client-side set-top box 305 and the server-side application server 340 is typically passed through the "out of band" data links. Alternatively, an "in band" data carousel may be positioned in an "in band" channel into which a data feed may be processed from the server-side application server 340 through the HFC network 315 to the client-side STB 305. Operation of data transport between components of the CATV system 300, described with reference to FIG. 3, is well known to those skilled in the art.

According to one embodiment data passed between the CATV system 300 backend components such as the head end 310 and the CATV system 300 front end components such as the STB 305 may be passed according to the Data Over Cable Service Interface Specification (DOCSIS). As is well known to those skilled in the art, DOCSIS provides for a mechanism for data transport over a cable system such as the CATV system 300, illustrated in FIG. 3. Among other things, DOCSIS allows for the passing of digital communications and Internet connectivity over an HFC network 315.

Referring still to FIG. 3, the head end 310 of the CATV system 300 is positioned on the server side of the CATV system 300 and includes hardware and software systems responsible for originating and managing content for distributing through the HFC network 315 to client-side STBs 305 for presentation to customers via televisions 320. As described above, a number of services may be provided by the CATV system 300, including digital and analog video programming, interactive television services, telephone services, video-on-demand services, targeted advertising, and provision of information content.

The application server 340 is a general-purpose computing system operative to assemble and manage data sent to and received from the client-side set-top box 305 via the HFC network 315. As described above with reference to the set-top box 305, the application server 340 includes a middleware layer 342 for processing and preparing data from the head end of the CATV system 300 for receipt and use by the client-side set-top box 305. For example, the application server 340 via the middleware layer 342 may obtain data from third-party services 346 via the Internet 180 for transmitting to a customer through the HFC network 315 and the set-top box 305. For example, a weather report from a third-party weather service may be downloaded by the application server via the Internet 180. When the application server 340 receives the downloaded weather report, the middleware layer 342 may be utilized to format the weather report for receipt and use by the set-top box 305. According to one embodiment of the present invention, data obtained and managed by the middleware layer 342 of the application server 340 is formatted according to the Extensible Markup Language and is passed to the set-top box 305 through the HFC network 315 where the XML-formatted data may be utilized by a client application 325 in concert with the middleware layer 324, as described above. As should be appreciated by those skilled in the art, a variety of third-party services data, including news data, weather data, sports data and other information content may be obtained by the application server 340 via distributed computing environments such as the Internet 180 for provision to customers via the HFC network 315 and the set-top box 305.

According to embodiments of the present invention, the application server 340 obtains customer profile data from services provider data services 360 for preparing a customer profile that may be utilized by the set-top box 305 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 3, the services provider data services 360 include a number of services operated by the services provider of the CATV system 300 which may include data on a given customer. For example, a billing system 362 may include information such as a customer's name, street address, business identification number, Social Security number, credit history, and information regarding services and products subscribed to by the customer. An electronic mail system 364 may contain information such as electronic mail addresses, high-speed Internet access subscription information and electronic mail usage data. An authentication system 366 may include information such as secure user names and passwords utilized by customers for access to network services. The customer information database 368 may include general information about customers such as place of employment, business address, business telephone number and demographic information such as age, gender, educational level, and the like. As should be understood by those skilled in the art, the disparate data services systems 362, 364, 366, 368 are illustrated as a collection of data services for purposes of example only. The example data services systems comprising the data services 360 may operate as separate data services systems, which communicate with a web services system (described below) along a number of different communication paths and according to a number of different communication protocols.

Referring still to FIG. 3, a web services system 350 is illustrated between the application server 340 and the data services 360. According to embodiments of the present invention, the web services system 350 serves as a collection point for data requested from each of the disparate data services systems comprising the data services 360. When the application server 340 requires customer profile data from one or more of the data services 360 for preparation or update of a customer profile, the application server 340 passes a data query to the web services system 350. The web services system formulates a data query to each of the available data services systems for obtaining any available data for a given customer as identified by a set-top box identification associated with the customer. The web services system 350 serves as an abstraction layer between the various data services systems and the application server 340. That is, the application server 340 is not required to communicate with the disparate data services systems, nor is the application server 340 required to understand the data structures or data types utilized by the disparate data services systems. The web services system 350 is operative to communicate with each of the disparate data services systems for obtaining necessary customer profile data. The customer profile data obtained by the web services system is assembled and is returned to the application server 340 for ultimate processing via the middleware layer 342, as described above.

As described herein, embodiments are directed to providing notification of missed voice calls directed to non-responsive called party devices in a communication network. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing a notification of missed voice calls directed to non-responsive called party devices in a communication network, comprising:
   receiving, at a messaging platform, a call directed to a called party device when the called party device is in a non-responsive state;
   storing call data associated with the call at the messaging platform;
   generating a notification utilizing the stored call data at the messaging platform; and
   sending the notification from the messaging platform to at least one of a called party device and a device associated with the called party, the notification comprising at least an identification of the calling party and a date and time when the call was made, wherein sending the notification comprises:
   determining that the called party device is in a responsive state by waiting to receive a confirmation from a communication switch that the called party device is receiving a signal from a communication base station prior to sending the notification; and
   sending the notification from the messaging platform to the called party device, wherein the notification is sent based on a user-specified schedule set by the called party, wherein when, based on a time period established in the user-specified schedule, a determination is made that the called party device is not proximate to the called party, the notification is sent to an alternate device associated with the called party, the alternate device being determined, based on the user-specified schedule, to be proximate to the called party during the time period.

2. The method of claim 1, wherein receiving, at a messaging platform, a call directed to a called party device when the called party device is in a non-responsive state comprises receiving the call, at the messaging platform, directed to the called party device when the called party device is turned off and when a voicemail message is not received by the messaging platform.

3. The method of claim 1, wherein receiving, at a messaging platform, a call directed to a called party device when the called party device is in a non-responsive state comprises receiving the call, at the messaging platform, directed to the called party device when the called party device is out of range of a coverage area served by the communication network and when a voicemail message is not received by the messaging platform.

4. The method of claim 1, wherein storing call data associated with the call at the messaging platform comprises storing at least one of a directory number associated with the calling party, a name of the calling party, and a date and time when the call was received.

5. The method of claim 1, further comprising:
   prior to generating a notification utilizing the stored call data at the messaging platform, accessing a database associated with the messaging platform; and
   comparing the stored call data associated with the call with the database to determine a match.

6. The method of claim 1, wherein generating a notification utilizing the stored call data at the messaging platform comprises generating an electronic mail message.

7. The method of claim 1, wherein generating a notification utilizing the stored call data at the messaging platform comprises generating a short message service (SMS) message.

8. The method of claim 1, wherein sending the notification from the messaging platform to at least one of the called party device and a device associated with the called party, the notification comprising at least an identification of the calling party and a date and time when the call was made, comprises sending the notification from the messaging platform to a mobile device associated with the called party.

9. The method of claim 1, wherein sending the notification from the messaging platform to at least one of the called party device and a device associated with the called party, the notification comprising at least an identification of the calling party and a date and time when the call was made, further comprises sending a location of the calling party device in the notification.

10. A method of providing a notification of missed voice calls directed to non-responsive called party devices in a cable services network, comprising:
   receiving, at a messaging platform, a call directed to a called party device when the called party device is in a non-responsive state;
   storing call data associated with the call at the messaging platform;

generating a notification utilizing the stored call data at the messaging platform; and sending the notification from the messaging platform to a network device associated with the called party in the cable services network, the notification comprising at least an identification of the calling party and a date and time when the call was made, wherein sending the notification comprises:

determining that the called party device is in a responsive state by waiting to receive a confirmation from a communication switch that a cable services set-top box associated with the called party is receiving a signal from a communication base station prior to sending the notification; and sending the notification from the messaging platform to the cable services set-top box associated with the called party, wherein the notification is sent based on a user-specified schedule set by the called party, wherein when, based on a time period established in the user-specified schedule, a determination is made that the called party device is not proximate to the called party, the notification is sent to the cable services set-top box associated with the called party, the cable services set-top box being determined, based on the user-specified schedule, to be proximate to the called party during the time period.

11. The method of claim 10, wherein receiving, at a messaging platform, a call directed to a called party device when the called party device is in a non-responsive state comprises receiving the call, at the messaging platform, directed to the called party device when the called party device is turned off and when a voicemail message is not received by the messaging platform.

12. The method of claim 10, wherein storing call data associated with the call at the messaging platform comprises storing at least one of a directory number associated with the calling party, a name of the calling party, a date and time when the call was received, and a geographic location of the calling party device.

13. The method of claim 10, further comprising:
prior to generating a notification utilizing the stored call data at the messaging platform, accessing a database associated with the messaging platform; and
comparing the stored call data associated with the call with the database to determine a match.

14. The method of claim 10, wherein generating a notification utilizing the stored call data at the messaging platform comprises generating an electronic mail message.

15. A method of providing a notification of missed voice calls directed to non-responsive mobile devices in a telecommunications network, comprising:
receiving, at a messaging platform, a call directed to a mobile device associated with a called party when the mobile device is in a non-responsive state;

storing call data associated with the call at the messaging platform, the call data comprising at least one of a directory number associated with a calling party device, a name of a calling party, a date and time when the call was received, and a geographic location of the calling party device;

accessing a database associated with the messaging platform;

comparing the stored call data associated with the call with the database to determine a match;

generating a notification utilizing the stored call data at the messaging platform upon determining the match;

determining that the mobile device is in a responsive state; and sending the notification from the messaging platform to the mobile device, the notification comprising at least one of the directory number associated with the calling party device, the name of the calling party, the date and time when the call was received, and the geographic location of the calling party device, wherein sending the notification comprises:

determining that the called party device is in a responsive state by waiting to receive a confirmation from a communication switch that the called party device is receiving a signal from a communication base station prior to sending the notification; and sending the notification from the messaging platform to the called party device, wherein the notification is sent based on a user-specified schedule set by the called party, wherein when, based on a time period established in the user-specified schedule, a determination is made that the called party device is not proximate to the called party, the notification is sent to an alternate device associated with the called party, the alternate device being determined, based on the user-specified schedule, to be proximate to the called party during the time period.

16. The method of claim 15, wherein receiving, at a messaging platform, a call directed to a mobile device associated with a called party when the mobile device is in a non-responsive state comprises receiving the call, at the messaging platform, directed to the mobile device when a voicemail message is not received by the messaging platform and when the mobile device is at least one of turned off and out of range of a coverage area served by the communication network.

17. The method of claim 15, wherein generating a notification utilizing the stored call data at the messaging platform upon determining a match comprises generating an electronic mail message.

18. The method of claim 15, wherein generating a notification utilizing the stored call data at the messaging platform upon determining a match comprises generating a short message service (SMS) message.

* * * * *